Aug. 18, 1964

J. A. JACKSON 3,145,294

LINEAR FOOTAGE METER

Filed July 18, 1961

Inventor:
Jesse A. Jackson
By Henry H. Snelling
his Attorney

Aug. 18, 1964  J. A. JACKSON  3,145,294
LINEAR FOOTAGE METER
Filed July 18, 1961  2 Sheets-Sheet 2
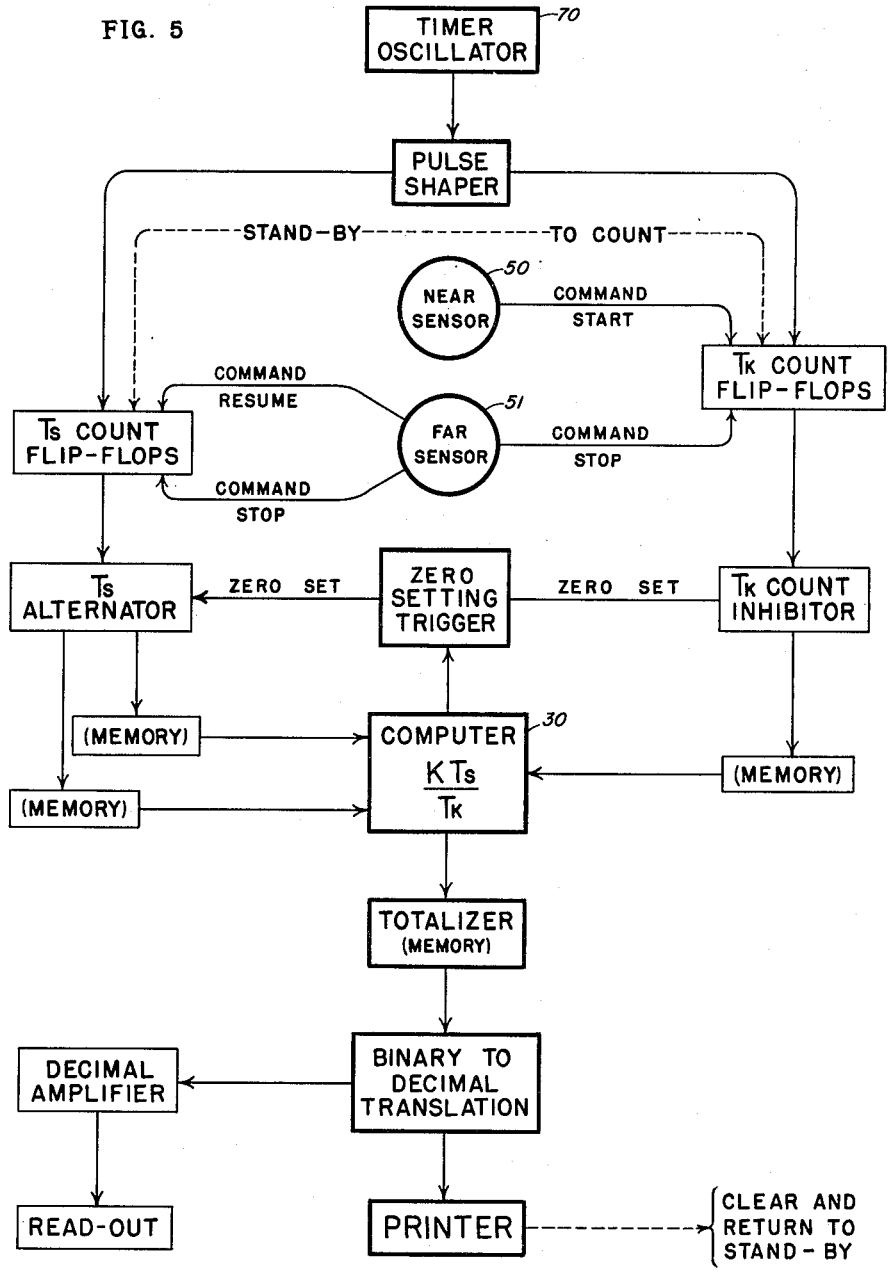

United States Patent Office 3,145,294
Patented Aug. 18, 1964

3,145,294
LINEAR FOOTAGE METER
Jesse A. Jackson, 5821 Dickson Road, Jacksonville, Fla.
Filed July 18, 1961, Ser. No. 124,941
10 Claims. (Cl. 235—151)

This invention relates to linear footage counters for measuring the total length of material in the form of a sheet, strip, rod, wire, thread, etc., and has for its particular object the provision of a relatively simple length-measuring device governed by the summation of a series of calculations from ratios of time increments, these ratios being free of linear dimensions and hence the total is uneffected by the speed of the material because when either term of the ratio is increased or decreased, the other term of that ratio is altered in like proportion.

Another object of the invention is the provision of a linear footage measuring device in which an electronic timer generates high frequency signals, material having spaced marks travels at high speed and passes over a roll or drum, and means are provided for counting the signals generated between passage of consecutive marks, for calculating the lengths between said marks by an electronic computer, and for totalizing by an electronic counter.

A further object of the invention is to provide a combination of means for placing a series of marks which need not be uniformly spaced on a strip of material to be formed into a roll, means for generating uniformly timed pulses; means for causing an electronic computer to start counting the pulses as a mark passes a chosen point, means for calculating the distances between the successive marks with relation to a known distance between two pick-up heads, and for totalizing the thus-calculated distances.

A specific object of the invention is the provision of a group of mechanisms for use with an ordinary paper mill winder so that an accurate determination of length of a roll of paper may be had even though there might be slippage between the winder mechanism and the paper. Slip thus affects only the spacing between marks and calculations are made by a summation of the distances between each two marks on the paper, whereby slippage would increase or decrease the numerator of the ratio between the time of passage of successive marks and the time for one mark to pass the known distance and thus would have no effect on the accuracy of the measurement, the time ratio being a dimensionless quantity.

Other objects of the invention are pointed out in the claims and pertain generally to details of the complete mechanism.

In the drawings:

FIG. 5 is a block diagram showing functional and sequential relations of counter components.

Figure 1:
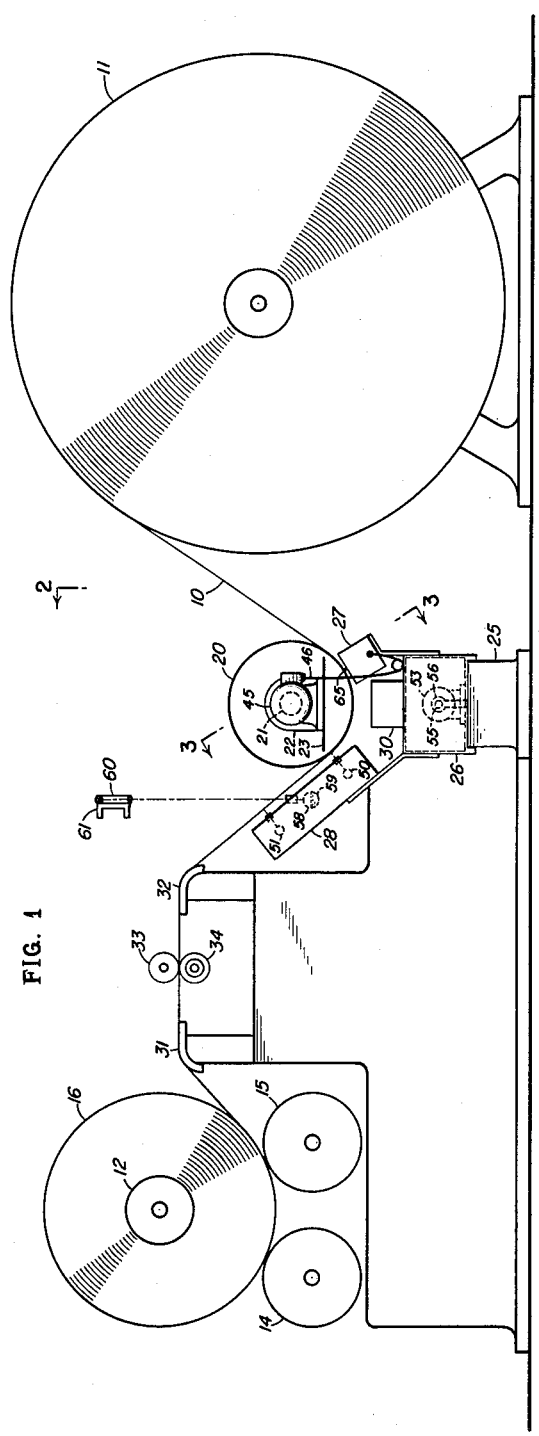
FIG. 1 is a partly schematic side elevational view of apparatus incorporating the invention.

FIG. 1 shows a sheet of paper 10 being wound from a jumbo roll 11 to a core 12 originally resting on the driving rolls 14 and 15 which now support the roll 16 which may be severed into a plurality of compact rolls of the same or of different widths. The sheet 10 passes under and drives lead-in roll 20 fast to shaft 21 turning in suitable bearings in brackets 22 secured to a portion of the winder frame 23. Below roll 20 but independent thereof is a heavy base 25 on which a carriage 26 is transversely adjustable to insure accuracy of alignment of the measuring mechanism with the edge of the paper sheet. On the carriage a printing housing 27 and a scanning arm 28 extend upwardly and outwardly on opposite sides of a computer 30 preferably of the digital type.

The paper mill winder is conventional including stationary guide rails 31 and 32, and slitter knives 33 and 34, which are adjustable so as to satisfy customers' requirements as to widths of the compact rolls 16.

Figure 3:
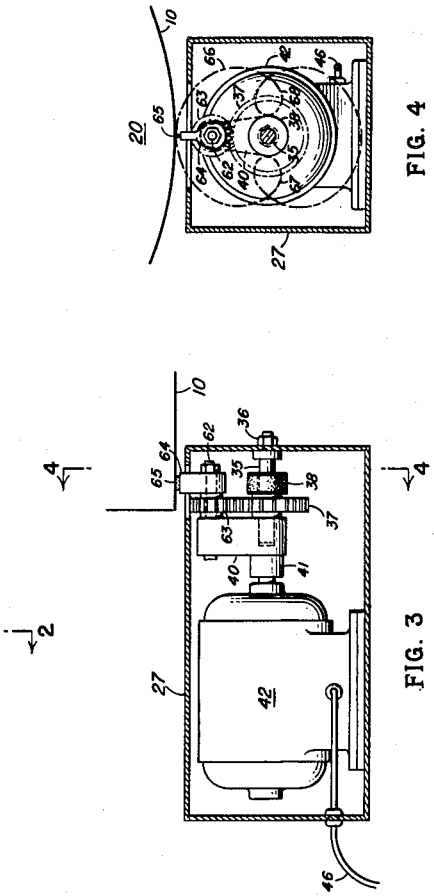
FIG. 3 is an enlarged detail section taken on the line 3—3 of FIG. 1, showing components of the printing mechanism.
Figure 2:
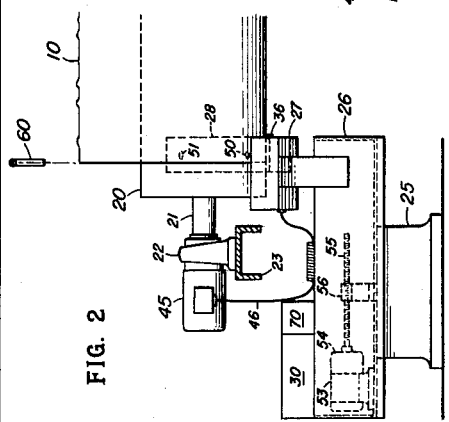
FIG. 2 is a fragmental vertical section, largely in elevation, taken on the lines 2—2 of FIG. 1.

The printing mechanism in housing 27 includes a stationary shaft 35 (FIG. 3) secured by nut 36 to support the fixed gear 37 and also the combined inking roll and reservoir 38 the latter turning freely on the shaft 35 which at its free end forms a bearing for crank 40 fast to a coupling 41 connected to a selsyn motor 42 driven by selsyn generator 45 through a flexible electric cable 46 which allows for lateral movement of carriage 26. The rotor of the generator 45 is driven by shaft 21 of lead-in roll 20.

The scanning arm 28 carries two infra-red sensors 50 and 51 conveniently referred to as the near (50) and the far (51) pickups as the sheet of paper 10 moves from sensor 50 to sensor 51 as it passes over and across the slitter rails 31 and 32 to the core shaft 12 to form the side by side compact rolls 16. The sensors are a fixed distance K apart. A convenient distance is 18 inches but if desired the distance could be a foot, a yard, or a meter to simplify calculations.

The carriage movement is governed by a reversible motor 53 driving speed reducer 54 which in turn rotates screw 55 passing through nut 56 fixed with respect to the stationary base 25. Motor 53 is controlled by signals from two photocells 58 and 59 receiving a narrow ray from light source 60 rigidly mounted on a bracket 61 on the winder frame. This assembly automatically provides the necessary edge indexing.

Figure 4:
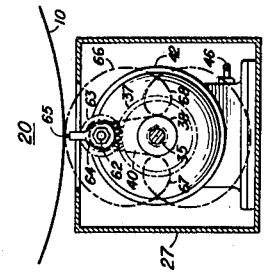
FIG. 4 is a transverse section taken on the line 4—4 of FIG. 3.

The crank 40 at its free end carries a shaft 62 on which rotate as a unit a rolling gear 63 and a rolling head 64 carrying an inked pad 65. Gear 63 with its meshing stationary gear 37 fixed to shaft 35 form an epicycloidal pair designed to move the pad 65 at the paper speed at the moment of contact. To achieve this result, the distance from the contact surface of the pad 65 and the centerline of the rolling gear shaft 62, together with the gear ratio of the pair 63–67 and the controlled speed of the selsyn motor 42 are designed to move the pad 65 in a prolate trochoical path shown by the dotted line 66 in the FIG. 4. The inking pad 65 picks up fresh ink from the permeable surface of freely rotating inking well or reservoir 38 every time the pad passes an inner loop of the endless path 66, these loops being numbered 67 and 68. The ink pad 65 places marks on the paper at spaced distances S apart. Said distances S need not be accurately equal to each other, since the accuracy of the final result from this device is derived from the accuracy of the timer oscillator. Such distance S should be greater than the distance K. In a conventional winder of this type, the drives for the rolls 14 and 15 are provided with controls for starting, bringing up to speed, slowing down or braking, and jogging or inching slowly in either direction. Likewise, the backstand for the jumbo reel 11 is provided with a similar drive.

In operation, the sheet is threaded under the lead-in roll 20, over and across the slitter rails 31 and 32, and started on the core shaft 12 which initially rests on the drive rolls 14 and 15. Slow rotation of the jumbo reel 11 and the drive rolls 14 and 15 is required for this threading operation. As soon as the paper is started on the core shaft 12, the winder is then brought up to speed. The amount of paper passed during this threading operation is negligible compared to the usual length of paper on a finished roll. Therefore the counting devices need not be operating during this period, but are started instantaneously with the acceleration of the paper above the threading speed, and are cut off when the paper is slowed down below the same speed. The push-button or rheostat (not shown) which is used to control winding speed is therefore also used to operate switches to energize computer 30 and the command signals from the pickups 50 and 51. The indexing mechanism 53 to 60 inclusive is usually energized at all times, independent of the other circuits. When the winder reaches its maximum speed it runs at a fairly steady rate until the finished roll or rolls 16 approach the desired length at which time the winder is slowed to a stop.

At the start, the computer begins counting pulses from the timer oscillator 70 in an array of circuits which are subject to command signals from the far infra-red sensor 51. This count accumulates in these circuits and represents a measurement of the time $T_s$ which elapses between the passage past pickup 51 of two successive spots. At the same time, pulses from the same source are counted in other circuits which are subject to command signals from both infra-red sensors 50 and 51. This count does not start at the same instant as the count $T_s$ but begins on signal from sensor 50 and accumulates only while a spot is passing from "near" scanner 50 to "far" scanner 51. Since these sensors 50 and 51 are a known and fixed distance apart, we designate this time $T_k$, and the corresponding distance K is measured in feet. It should be noted that other arrangements of the command signals could be used. For instance, the time $T_k$ may if desired be ascertained by passage of a mark past sensors other than 50 and 51, spaced apart the distance K. However, with the embodiment described here, the computer circuits are much simplified if the ratio between the selsyn generator and the motor 18 driving the printer is such that the numerical value of $T_k$ under all conditions is less than that of $T_s$.

At the instant when a second spot reaches farther sensor 51 we have accumulated a number in each of two arrays of circuits. This number might or might not be a binary coded number, as its form would be dependent upon the type of components used. The signal from sensor 51 then commands the computer to divide $T_s$ by $T_k$ and multiply by the constant K, the result being accumulated in the memory of the totalizer. When the winder is running, the above counting and calculating operation is repeated for the space between each two successive spots, thus actually measuring each interval and accumulating the total. When the winder has been slowed to a stop, the switching off of the drive control also de-energizes the printer, timer, computer and command circuits, and commands the read-out device to display or print-out the accumulated length from the totalizer for the set of finished rolls 16.

The distance S between any two spots divided by the number of time-pulses $T_s$ is the average rate of movement of the paper in feet per unit of time, or $S/T_s$, during the particular interval. Likewise, the known distance K divided by the number of time pulses $T_k$ is an average rate, $T_x$, over the latter part of the $T_s$ interval. For all practical purposes, and well within the limits of ordinary engineering accuracy, these two rates are the same. Furthermore, it can be seen that any slight difference which occurs while the winder is being brought up to speed will be offset by a similarly slight difference of opposite sign while the winder is being slowed to a stop. Therefore, we can employ the equality, $S/T_s = K/T_k$, and solve for $S = KT_s/T_k$. This is what our computer does every time a spot passes farther sensor 51, the sum of these accumulated results being the total length desired.

The measurements produced by this device are independent of the actual times involved in the counting, calculating and totalizing operations since the ratio $T_s/T_k$ is a dimensionless quantity, and the electronic circuits perform in microseconds.

Furthermore, accuracy and reliability result from the fact that no dependence is placed upon any mechanical device. In this connection, if slip occurs between the lead-in roll 20 and the paper which drives it, this merely changes the spacing of the printed spots, increasing or decreasing the $T_s$ and $T_k$ counts in equal proportions, without affecting the accuracy of the calculation which is made for each interval, and bringing about the same total measurement for the completed roll as would have been made if no such slip occurred.

As an example of a suitable application, a conventional winder with top operating speed of 6000 feet per minute and a lead-in roll 20 of 24″ diameter may be considered. For this machine, the printing pad 65 is designed to place marks about 6.25 feet apart and the infra-red sensors 50 and 51 are positioned exactly 1.5 feet apart. If the timers produce 10,000 pulses per second, the count $T_s$ for a full speed interval will be 625, and the $T_k$ count will be 150. Thus, the computer calculation for this interval will be $S = 1.5$ times 625/divided by 150, or exactly 6.25 feet. At 6000 feet per minute, this calculation will be performed about 16 times per second, which is relatively very slow compared to the capabilities of electronic computers.

For winder machines having different characteristics, the parametric values for pulses per second and distance K should be chosen to suit the particular operation. These may differ markedly from the example given above, with pulses per second as low as 1,000 or as high as 50,000, and distance K of a few inches or of several feet. In fact, the extremely rapid response time of the electronic computer makes it possible to apply this method with operating speeds many times greater than the 6000 feet per minute cited above. The preferred type of electronic computer for this application is the digital type employing binary numbers in a magnetic memory grid. This grid is divided into four parts, two of which are used alternatively to receive the counts of impulses from the $T_s$ counting flip-flop, see FIGURE 5. Another part receives the counts from $T_k$, while the fourth part receives the total of the lengths calculated by the computer. The provision of two alternately used portions for the $T_s$ counts allows time for an accumulated number to be sent to the computer from one portion while the count for the next number starts instantaneously in the other portion. This provision is not needed for the $T_k$ counts since there is a rest or "inhibited" period between each two successive $T_k$ counts. The capacity in binary bits of each portion of the grid is determined from the accuracy required for the length of paper on the finished rolls, or, in other words, the number of significant decimal figures in the final read-out or print-out. This contributes to the simplicity and economy of manufacture of the device, since the large memory capacity of the general purpose computer is not required.

It is not suggested that a unique computer has been created as each and every one of the mechanisms represented by blocks or rectangles in FIGURE 5 are old per se. The invention resides in the combining of the elements of my device together with any computer that performs the claimed functions in the described manner, there being many of these.

As a textbook example, there were on the market prior to July 1, 1961, a number of general purpose computers, any one of which could be used with programming such as is described in textbooks such as High Speed Computing Devices by Engineering Research Associates (McGraw-Hill 1950) or Thomas C. Bartee's Digital Computer Fundamentals published by the same firm ten years later.

A list of such well known general computers includes UNIVAC of Sperry Rand, Minneapolis-Honeywell's 800, the IBM NORC, the RAYDAC of Raytheon and the Philco TRANSAC.

More specifically, the block 70 can be of any type of clock, alternator, pulse generator or timer giving signals at an accurate rate of perhaps 10,000 per second. Depending upon the type of computer, the signals could be audible or not. The count flip-flops can be any mechanism that is able to receive pulse signals from the clock and transmit them in the form of numbers in obedience to command signals from the sensors in a logical sequence whereby the computer can perform the required arithmetic.

The alternator is preferably a mechanism of the type of the crystal clock #4407 manufactured by the Digital Equipment Corporation of Maynard, Massachusetts.

The memory is of any one of the well known types and the method of programming is as described in either of the textbooks mentioned above but since this field has advanced so very rapidly the memory portion will naturally follow the day to day improvements.

The computers mentioned each include the several separate items shown by blocks in FIGURE 5.

An alternative arrangement, differing only in the number of steps and their sequences, would be to have the $T_k$ count held in one counter $C_1$ while the $T_s$ count accumulates in another counter $C_3$ until it reaches the number being held in $C_1$ when a "coincidence" circuit clears $C_3$ and adds a one (1) count into another counter $C_4$ and starts immediately counting again in $C_3$. This is repeated so that a series of unity ratios or ones are added in $C_4$. When the next $T_s$ spot passes the first sensor, the $T_k$ number being held in $C_1$ is cleared and a new count of $T_k$ goes into an alternate counter $C_2$, the "coincidence" circuit then uses this new number to control the extent of the $T_s$ counts to $C_3$ during the second $T_s$ period. This alternate use of $C_1$ and $C_2$ counters thus avoids interference in the circuits. When a roll is full, the number of "one" ratios counted in $C_4$ is multiplied by K to give the result in feet to the read-out or printer.

What I claim is:

1. The method of accurately measuring the length of material moving in a path which comprises producing accurately timed pulses, marking the material at spaced distances of about equal length, counting the pulses occurring between passage of two successive marks past a fixed point in said travel, counting the pulses occurring during passage of one of said successive marks between two fixed points an accurately measured distance apart, dividing the first count by the second count to obtain a dimensionless ratio, multiplying the accurately measured distance by said ratio to determine the exact distance between the two successive marks, and totalizing the incremental distances so obtained.

2. The method of claim 1 in which the counting, the division, the multiplication, and the additions are performed by an electronic computer.

3. The method of accurately measuring the length of a material moving in a path and carrying spaced markings which comprises measuring the time it takes two successive marks to pass a given point, measuring the time it takes one of said marks to move an accurately measured distance of less than the distance between successive marks, then calculating a non-dimensional ratio between said times, multiplying the ratio by said distance, and totalizing the several products.

4. The method of measuring the length of an elongated material moving in a path which comprises placing uniformly spaced marks upon the material, placing a plurality of sensors a fixed distance apart in the path of travel of the marks, producing time pulses of extremely small duration, counting the number of pulses elapsing between passage past one of said sensors of two successive marks, counting the number of pulses elapsing between passage of the one of said successive marks between two sensors a fixed distance apart, dividing the first count by the second count to obtain an incremental time factor indicating tht rate of speed the material is traveling at that moment and totalizing the sum of the product of the several incremental time factors multiplied by the distance between said two sensors.

5. In combination, a moving material having thereon a plurality of spaced indications, a digital computer, means for feeding to the computer the number of time units required for passage of one of said marks past an accurately measured distance while the material between two successive marks is passing such distance, means feeding to the computer the time units required for said two successive marks to pass a given point proximate said accurately measured distance, and means within the computer for dividing one of the two time unit counts by the other to establish a dimensionless ratio, multiplying this ratio by the accurately measured distance and adding the accumulated products so obtained.

6. In a device for measuring an elongated piece of material, a lead-in roll in contact with the material, printing means driven by the roll for placing marks on the material, a plurality of sensors in the path of the marks; electronic means for determining the number of time units required for two consecutive marks to pass a given sensor, the number of time units required for one of said two marks to travel an accurately measured distance, dividing the one count by the other count, multiplying the ratio so obtained by the accurately measured distance, and totalizing the products.

7. The device of claim 6 in which the printing mechanism includes a selsyn generator synchronous with the revolutions of the lead-in roll, a selsyn motor, a crank arm on the motor shaft, a rolling head on the free end of the arm, an inking pad on the rolling head arm and mechanism for moving the rolling head to cause the inking pad to move in a prolate trochoidal path.

8. The device of claim 6 in which the sensors are two in number and are a distance apart less than the distance apart of the marks, the ratio is obtained by dividing the larger count by the smaller count.

9. In a device for accurately measuring the length of a roll of paper, a winder machine of the type including a frame in which a core is rotated to wind the paper into roll form after the material drives a lead-in roll, means driven by the lead-in roll for printing spaced marks on the edge of the paper as it passes the lead-in roll, an infra-red sensor proximate the lead-in roll in position to send a signal upon passage of each of said marks, a second infra red sensor mounted on the winder frame parallel to the portion of the path the paper moves as the marks actuate the sensors which are an accurately measured distance apart, means for shifting the sensors and the printing means laterally as a unit to assure accurate edge indexing, an electronic timer generating high frequency pulses and a digital computer of the type suitable upon signals from the sensors for counting the number of pulses generated between the passage of two successive marks past one of the sensors, the passage of one of such marks between the spaced sensors, dividing the first count by the second count, multiplying the quotient by the fixed distance apart of the sensors to give an incremental distance and for indicating the total of all the incremental distances thus calculated.

10. The device of of claim 9 in which the digital computer includes a four-part memory grid of which two of said parts are counters alternately counting impulses from a pulse generator in obedience to command signals from pick-up sensors, whereby to allow time for an accumulated number to be sent to the computer from one of said counters during the time the count for the next number has instantaneously been started in the other counter.

References Cited in the file of this patent
UNITED STATES PATENTS

| | | |
|---|---|---|
| 2,815,577 | Ferre | Dec. 10, 1957 |
| 2,824,374 | Abrams et al. | Feb. 25, 1958 |
| 2,987,953 | Stade | June 13, 1961 |